United States Patent
Conklin, Jr.

(10) Patent No.: US 6,186,314 B1
(45) Date of Patent: Feb. 13, 2001

(54) CONVEYOR PANEL WITH INDICIA AND METHOD OF PRESENTATION

(75) Inventor: Dennis R. Conklin, Jr., Phoenix, AZ (US)

(73) Assignee: CarroSELL, Inc., New York, NY (US)

( * ) Notice: Under 35 U.S.C. 154(b), the term of this patent shall be extended for 0 days.

(21) Appl. No.: 09/354,877

(22) Filed: Jul. 16, 1999

(51) Int. Cl.[7] .................................................. B65G 15/02
(52) U.S. Cl. ........................................................ 198/502.1
(58) Field of Search ........................ 198/502.1; 401/472, 401/524, 526

(56) References Cited

U.S. PATENT DOCUMENTS

| | | |
|---|---|---|
| 1,812,715 | 6/1931 | Quillin et al. . |
| 3,410,390 | 11/1968 | Petersen . |
| 3,416,645 | 12/1968 | Jones . |
| 3,612,244 | 10/1971 | Raub et al. . |
| 3,849,918 | 11/1974 | Mazzocco, Sr. . |
| 3,881,592 | 5/1975 | Stimpson . |
| 3,900,647 | 8/1975 | Scardilli et al. . |
| 3,982,625 | 9/1976 | Wentz et al. . |
| 4,827,644 | 5/1989 | Trame . |
| 4,979,591 | 12/1990 | Habegger et al. . |
| 5,165,526 | 11/1992 | Conklin, Jr. . |
| 5,209,340 | 5/1993 | Munkner et al. . |
| 5,244,080 | * 9/1993 | Bierbaum ........................ 198/502.1 |
| 5,280,831 | 1/1994 | Conklin, Jr. . |
| 5,330,044 | 7/1994 | Conklin, Jr. . |
| 6,044,961 | * 4/2000 | Hine ................................ 198/502.1 |

FOREIGN PATENT DOCUMENTS

| | | |
|---|---|---|
| 0 400 250 | 12/1990 | (EP) . |
| 2 660 785 | 4/1990 | (FR) . |
| 2 044 715 | 10/1980 | (GB) . |

* cited by examiner

*Primary Examiner*—Christopher P. Ellis
*Assistant Examiner*—Mark A. Deuble
(74) *Attorney, Agent, or Firm*—Parsons & Goltry; Robert A. Parsons; Michael W. Goltry

(57) ABSTRACT

A conveyor panel for use on an endless conveyor including a base plate, an indicia plate and an indicia sheet. The base plate includes an upper surface, the upper surface having a recess formed therein and bounded by a slot on at least one side. The indicia plate includes a first sheet overlying a second sheet, with the indicia sheet captured between the first sheet and the second sheet. The indicia plate is removably carried in the recess of the indicia plate, and extends into the slot on at least one side.

15 Claims, 5 Drawing Sheets

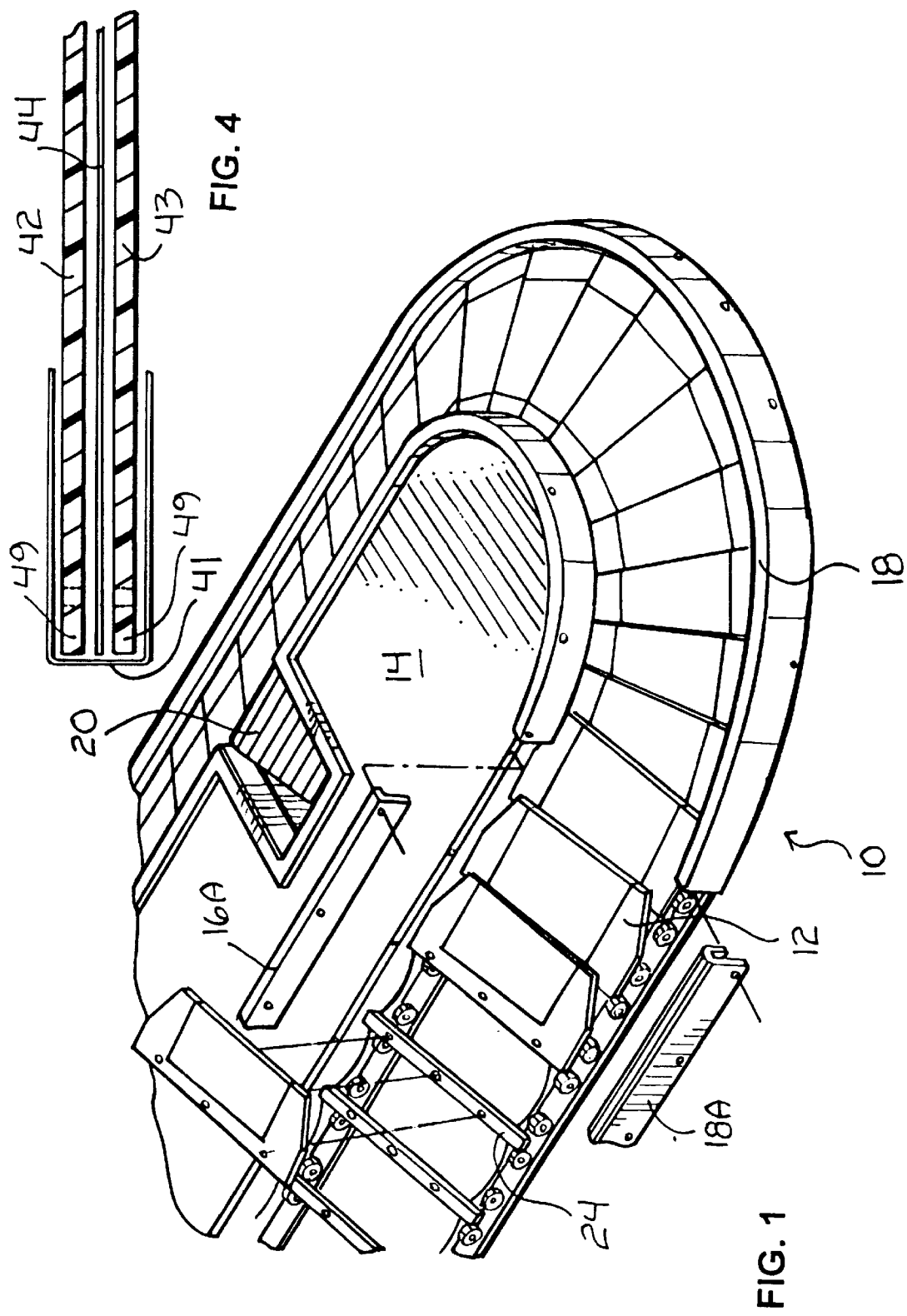

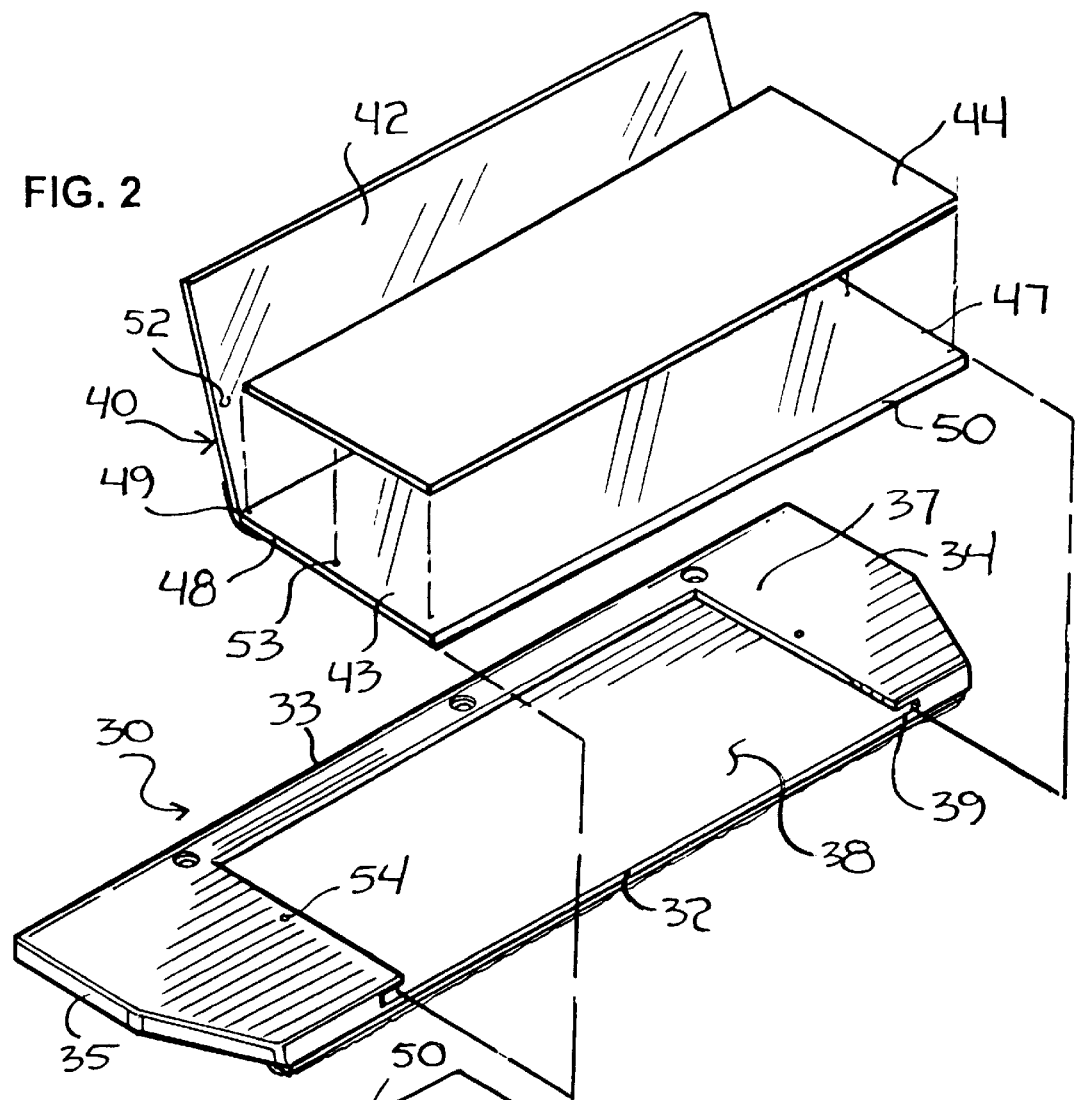

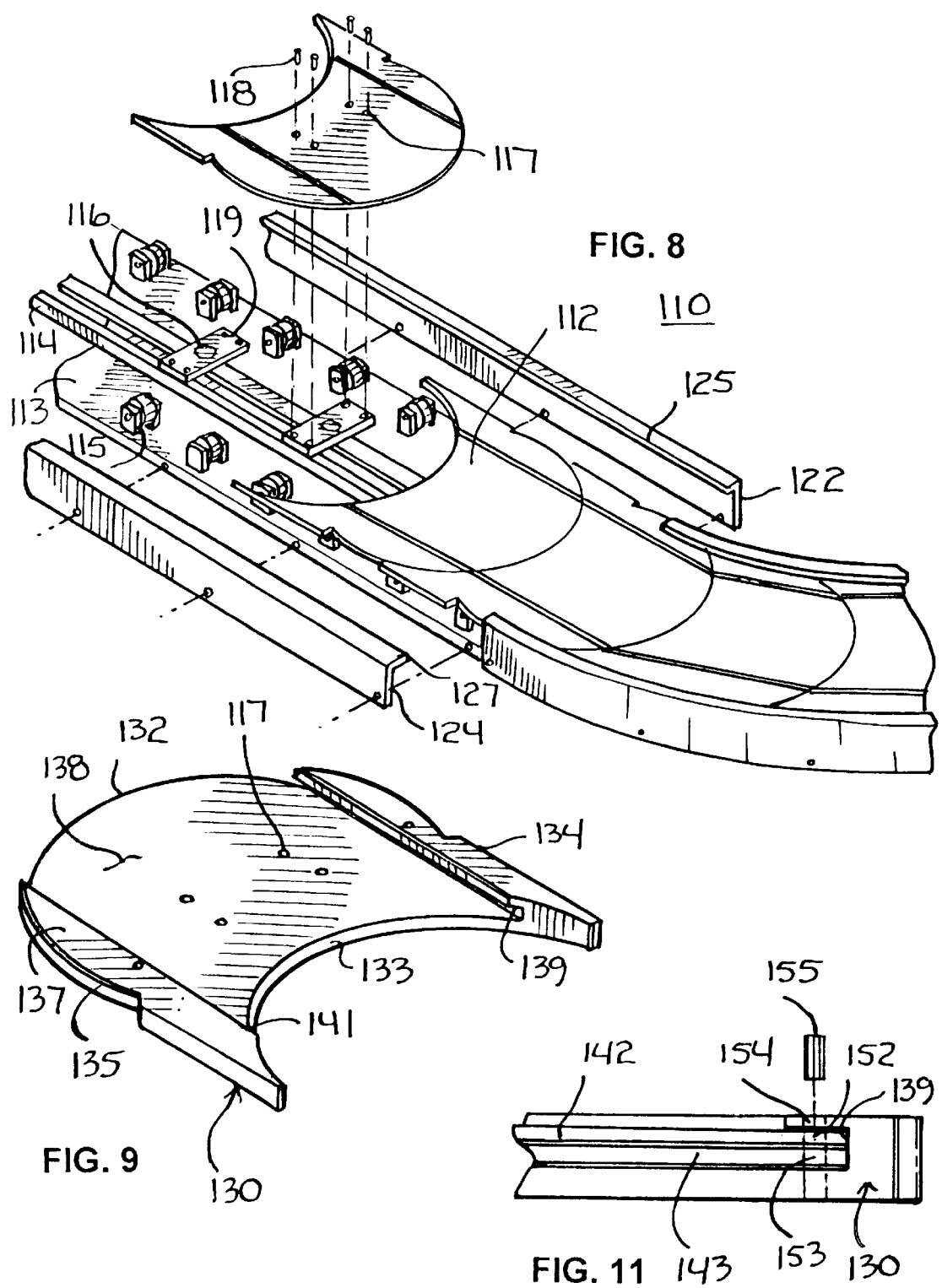

CONVEYOR PANEL WITH INDICIA AND METHOD OF PRESENTATION

FIELD OF THE INVENTION

This invention relates to methods and devices for advertising.

More particularly, the present invention relates to visual information such as advertising on endless conveyors.

In a further and more specific aspect, the instant invention concerns panels having visual information forming the load carrying platforms on baggage carousels.

BACKGROUND OF THE INVENTION

Conveyors for carrying items from one location to another location are well-known in the art. In a specific example, conveyors are placed into an endless essentially circular orientation for dispensing baggage at airports. Recently, panels have been developed for carrying and presenting advertising to passengers waiting for their baggage. Notable among these devices is a sheet containing advertising adhered to the top surface of the conveyor panels. While presenting advertising to waiting passengers, this method is relatively ineffectual as the baggage and items carried by the carousel damage the sheets, obscuring the advertising. A much more effective approach has been adhering sheets containing indicia to the bottom of a transparent panel. In this manner the relatively fragile sheet containing indicia is protected from the baggage and items carried by the carousel. While very effective, this method has a drawback of being relatively expensive.

In both of the foregoing devices, sheets containing the indicia are adhered to the carousel panels. Thus when the sheets and indicia are damaged or when new indicia is desired, the entire panel must be replaced. Replacement of the panels on a baggage carousel is labor-intensive as well as costly.

It would be highly advantageous, therefore, to remedy the foregoing and other deficiencies inherent in the prior art.

Accordingly, it is an object of the present invention to provide a new and improved baggage carousel.

Another object of the invention is to provide a conveyor panel with easily replaceable indicia.

And another object of the invention is to provide a new improved method of advertising a conveyor.

Yet another object of the present invention is to provide an advertising device which is highly visible and durable.

And yet another object of the present invention is to provide a new improved method for making and using an advertising device for use on conveyor systems, which is relatively inexpensive, and produces highly visible and durable advertising devices.

Still another object of the present invention is to provide a panel which can be used with conveyors, a plurality of which may be used on each conveyor, in which can be individually replaced are changed to change visual information without replacing the panel.

SUMMARY OF THE INVENTION

Briefly, to achieve the desired objects of the instant invention in accordance with a preferred embodiment thereof, provided is a conveyor panel for use on an endless conveyor including a base plate, an indicia plate and an indicia sheet. The base plate includes an upper surface, the upper surface having a recess formed therein and bounded by a slot on at least one side. The indicia plate includes a first sheet overlying a second sheet, with the indicia sheet captured between the first sheet and the second sheet. The indicia plate is removably carried in the recess of the indicia plate, and extends into the slot on at least one side.

Also provided is a method of displaying indicia on an endless conveyor. A plurality of conveyor panels are provided. Each panel includes a base plate and an indicia plate. The plurality of conveyor panels are installed on the endless conveyor. The indicia plate is removed and the first sheet is separated from its overlying engagement with the second sheet. An indicia sheet carrying the desired indicia is placed between the first sheet and the second sheet. The first sheet is replaced in its overlying engagement with the second sheet, and the indicia plate is inserted into the recess so it extends into the slot on at least one side.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 1 is a perspective view of a baggage carousel according to the present invention;

FIG. 2 is an exploded perspective view of a conveyor panel according to the present invention;

FIG. 3 is a partial perspective view illustrating overlapping conveyor panels of the baggage carousel of FIG. 1;

FIG. 4 is a partial cross-sectional view of the indicia plate according to the present invention;

FIG. 8 is a partial perspective view of another embodiment of a baggage carousel according to the present invention;

FIG. 9 is a perspective view of a base plate of the baggage carousel of FIG. 8;

FIG. 11 is a partial end view of the conveyor panel of FIG. 8.

DETAILED DESCRIPTION OF THE PREFERRED EMBODIMENT

Figure 5:
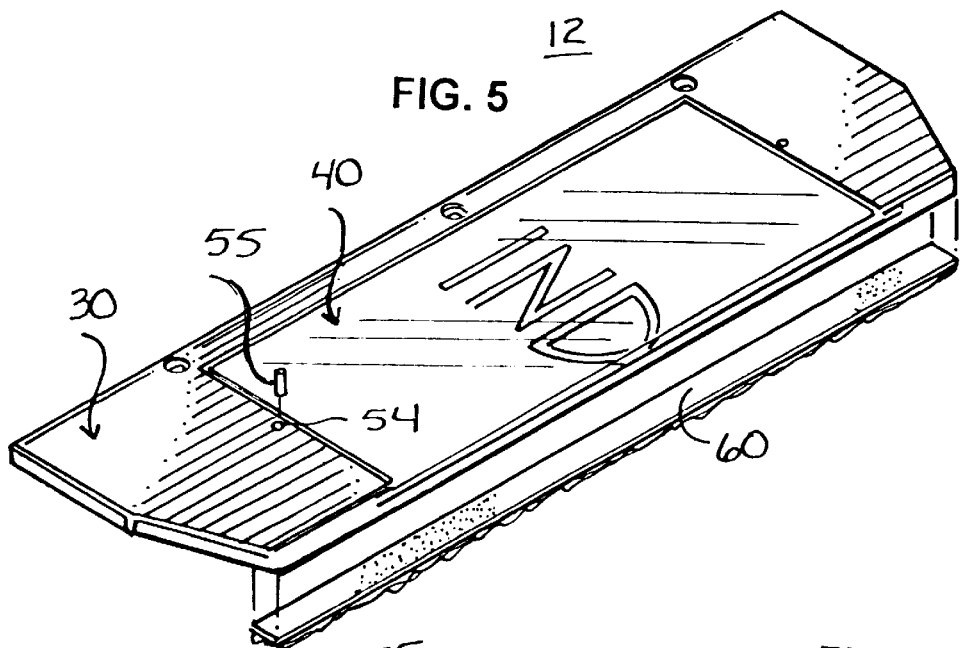
FIG. 5 is a partially exploded perspective view of the conveyor panel of the present invention.

Turning now to the drawings in which like reference characters indicate corresponding elements throughout the several views, attention is first directed to FIG. 1 illustrating a baggage carousel generally designated 10. While the present invention may be used with endless conveyors in general, it is especially useful for improving baggage carousels well known in airports. Baggage carousel 10 includes a plurality of conveyor panels 12 that move around the periphery of carousel 10 carrying baggage and other items to waiting people. Panels 12 are upstanding between an elevated platform 14 with an upper rail 16 around its periphery and a lower rail 18 around the periphery of the entire carousel. A section is removed from elevated platform 14 for baggage loading means such as a belt conveyor 20. Belt conveyor 20 carries the baggage from a baggage loading area, generally placed at a lower level. Belt conveyor 20 carries the baggage up to the height of elevated platform 14 to slide the baggage onto conveyor panels 12. Since conveyor panels 12 are at an inclined angle, the baggage slides down conveyor panels 12 from the level of upper rail 16 to the level of lower rail 18.

Still referring to FIG. 1, an exploded section of carousel 10 shows individual conveyor panels 12 and a section of the transport means that causes panels 12 to be transport around the circumference of carousel 10. An upper rail section 16A is shown removed from the remaining portion of upper rail 16. Likewise, a lower rail section 18A is removed from the remaining section of lower rail 18 located around the periphery of carousel 10. This permits panels 12 to be removed from the transport system itself. Conveyor panels 12 are fastened with screws, for instance, to a plurality of spaced apart support bars 24. Each support bar 24 is interconnected with adjacent support bars forming a continuous circuit. The structure of the baggage carousel will not be described in detail as it is well known to those skilled in the art.

Referring now to FIG. 2, conveyor panel 12 is illustrated in exploded view. Panel 12 includes a base plate 30 having a leading edge 32, a trailing edge 33, a top edge 34, a bottom edge 35, and a top surface 37. A recess 38 is formed in top surface 37 intermediate top edge 34 and bottom edge 35, and extending from leading edge 32 to a point spaced from trailing edge 33. A slot 39 is formed in base plate 30 contiguous with recess 38, extending parallel to top surface 37, and directed toward top edge 34, bottom edge 35, and trailing edge 33. Conveyor panel 12 further includes an indicia plate 40 consisting of a sheet 42 and a sheet 43 with an indicia sheet 44 sandwiched therebetween. In the preferred embodiment, sheets 42 and 43 are transparent, permitting indicia on indicia sheet 44 to be viewed. It will be understood however, that the bottom sheet 43 need not be transparent as indicia is only viewed in one direction.

Still referring to FIG. 2, sheet 42 and sheet 43 of indicia plate 40 have an upper edge 47, a lower edge 48, a leading edge 49, and a trailing edge 50. With additional reference to FIG. 4, sheet 42 and sheet 43 are hingedly coupled at leading edges 49. The hinge coupling is achieved by adhering a material, such as tape 41, to aligned leading edges 49 of sheet 42 and sheet 43. In this manner, sheets 42 and 43 can be opened to receive indicia sheet 44 therebetween, while maintaining the desired alignment. It will be understood by those skilled in the art that the hinge coupling may be omitted as desired, resulting in slightly increased difficulty in aligning sheet 42 with sheet 43. Furthermore, while in the preferred embodiment the hinge coupling is formed with tape extending along the leading edge from the upper edge to the lower edge, it will be understood that one or more small sections of the leading edges may be hingedly coupled to achieve the same effect. It is also contemplated that the trailing edges or one of the top edge or the bottom edge of sheet 42 and sheet 43 may be hingedly coupled instead of the leading edge. This, however, would not be as effective as the preferred embodiment.

After indicia sheet 44 has been positioned between sheet 42 and sheet 43, indicia plate 40 is inserted within recess 38 of base plate 30. Insertion of indicia plate 40 onto base plate 30 may be accomplished in various manners. In the preferred embodiment, sheet 42 and sheet 43 are constructed of a material having a degree of flexibility such as plastic or resin materials like polycarbonate. Thus indicia plate 40 can be flexed, reducing the distance between upper edge 47 and lower edge 48. This reduced distance permits indicia plate 40 to be inserted into recess 38. Upon relaxing the flex, upper edge 47 and lower edge 48 are received within slot 39 proximate upper edge 34 and lower edge 35, respectively, of base plate 30. Trailing edge 50 of indicia plate 40 can then be inserted into slot 39 proximate trailing edge 33 of base plate 30 by exerting pressure on leading edge 49, thereby sliding indicia plate 40 toward trailing edge 33 of base plate 30. It should be understood that other materials of a more rigid nature may be employed for sheet 42 and sheet 43. In this case the flexed may be eliminated, requiring trailing edge 50 to be inserted in slot 39 at leading and 32 of base plate 30. Pressure exerted on leading edge 49 will result in indicia plate 40 moving along slot 39 toward trailing edge 33 of base plate 30.

The tolerances between slot 39 and indicia plate 40 may be close enough to provide for a friction fit therebetween, eliminating the need for other retaining apparatus. However, for added security, or if a tight fit has not been achieved or is not desired, a fastening element may be employed. With additional reference to FIGS. 5 and 6, in the preferred embodiment, an aperture 52 is formed in sheet 42 proximate lower edge 48 and an aperture 53 is formed in sheet 43 proximate lower edge 48. Aperture 52 is aligned with aperture 53 with sheet 42 overlying sheet 43 in the close position. An aperture 54 is formed in base plate 30 at slot 39 proximate lower edge 35. With indicia plate 40 positioned in recess 38, apertures 52, 53, and 54 align. A fastening member 55 such as a pin, screw, peg, etc., extends concurrently through apertures 52, 53, and 54, securely retaining indicia plate 40 in position.

Figure 6:
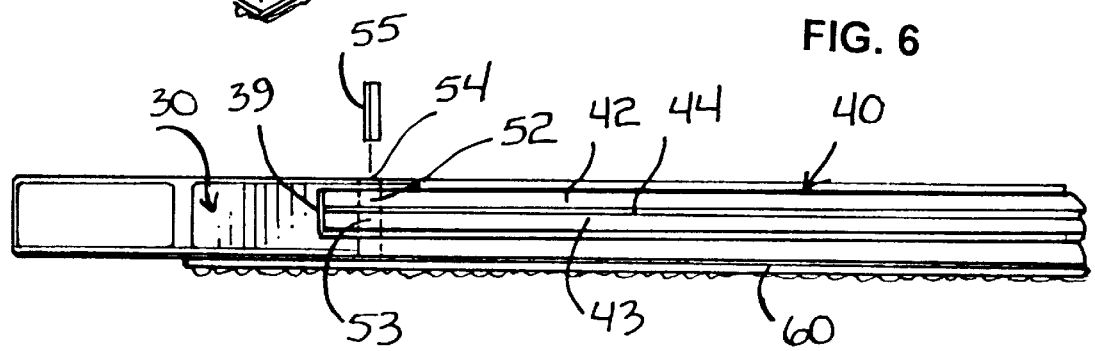
FIG. 6 is a partial end view of the panel of FIG. 5.
Figure 7:
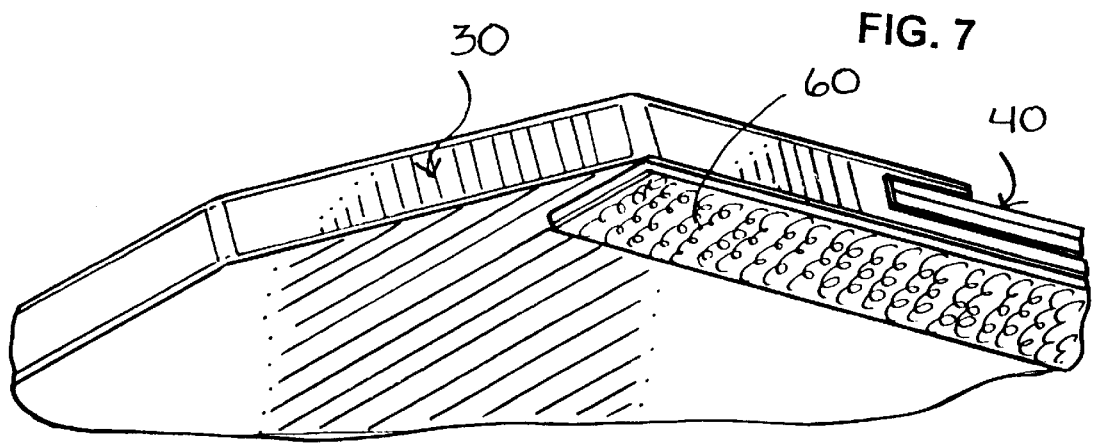
FIG. 7 is a partial perspective view of the conveyor panel of FIG. 5.

When installed on baggage carousel 10, conveyor panels 12 overlap adjacent panels 12 as illustrated in FIG. 3. Leading edges 32 of the overlapping panels cover a portion of trailing edges 33 of the panels to a point adjacent trailing edge 50 of indicia plate 40. This present a substantially unbroken view of indicia sheets 44 of adjacent panels, at least on the straight stretches of the baggage carousel. The overlap of panels 12 typically results in wear on the top surface of conveyor plate 12. To prevent damage to indicia plate 40, a buffer strip in 60 is affixed to the underside of base plate 30 along leading edge 32 (FIGS. 5–7). Additionally, wear on indicia plate 40 is substantial reduced because the top surface thereof is recessed with respect to top surface 37 of base plate 30. Indicia plate 40 is recessed by the thickness of base plate 30 between slot 39 and top surface 37. It will be understood that this recess may be eliminated if desired, by forming a groove in the top surface of sheet 43 having a depth corresponding to the previously described thickness of base plate 30. The slight recess will not effect the movement of baggage on the panels because the raised portions are very near rails 16 and 18.

Thus, panels 12 are installed on baggage carousel 10, as illustrated in FIG. 1, to form one or more single panel or compound panel images, as desired for advertising, etc. Changing the indicia employed is easily accomplished by removing the desired indicia plate 40, separating sheet 42 and sheet 43 with alignment maintained by the hinge coupling, and replacing sheet 44 with an indicia sheet containing the desired indicia. Sheet 42 and sheet 43 are then closed into aligned and overlying relationship with the new indicia sheet captured therebetween. Indicia plate 40 containing the new indicia is then inserted into recess 38 of base plate 30. During this entire procedure, base plate 30 can remain in position, attached to baggage carousel 10. Furthermore, sheet 42 and sheet 43 are reusable with only indicia sheet 44 being replaced.

Referring now to FIG. 8, a baggage carousel generally designated 110 is illustrated. In this embodiment, baggage carousel 110 is the flat type of carousel including a plurality of conveyor panels 112 each having a generally crescent shape. Carousel 110 includes a base 113 supporting a track 114 extending in a continuous circuit. A plurality of rollers 115 extend from base 113 on both sides of track 114, around the continuous circuit of track 114. Attachment members 116 are attached to drive means, supported by track 114 in a spaced apart relationship to one another. Conveyor panels 112 each have a convex edge and an opposing concave edge, which gives them a crescent shape. Each panel 112 is attached to a separate attachment member 116 by an attachment assembly. The attached panels 112 form a continuous platform around carousel 110, with each convex edge nesting against a concave edge of adjacent panel 112. Sides of panels 112 ride upon and are supported by rollers 115. The attachment assembly consists of bores 117 formed through a medial portion of panel 112, through which bolts 118 extend, to be received within corresponding bores 119 formed in attachment member 116.

Still referring to FIG. 8, rails 122 and 124 are attached to opposing edges of base 113, covering rollers 115, and partially overlapping panels 112. Panels 112 slide under overlapping trim portions 125 and 127 of rails 122 and 124 respectively. Overlapping trimmed portions 125 and 127 prevent items from dropping within carousel 110 and, since they are raised above the level of panels 112, also prevent items from falling off the platform created thereby. Further details of baggage carousel 110 have been omitted, as this type of carousel is well known to those skilled in the art.

Figure 10:
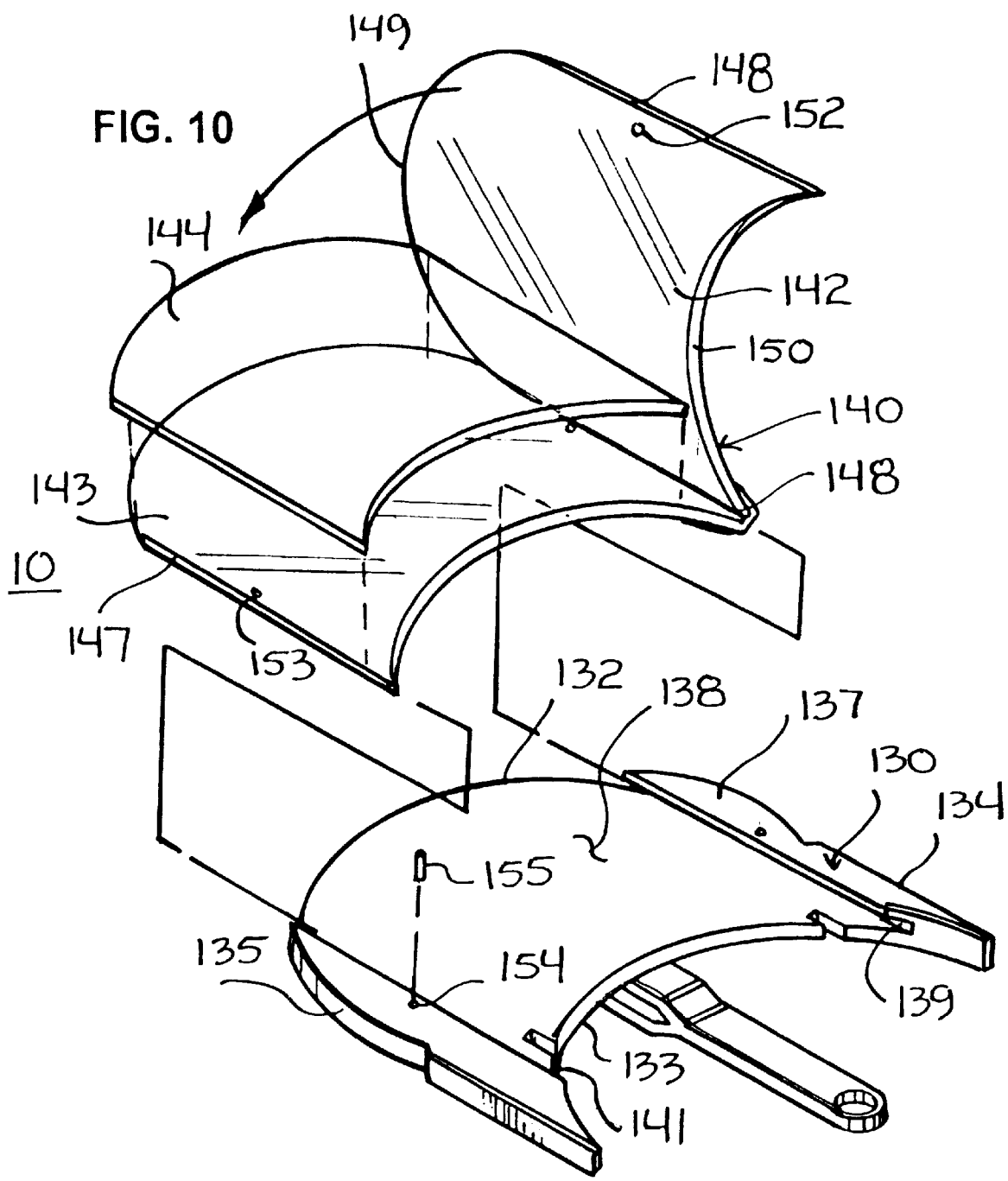
FIG. 10 it is end exploded view of the conveyor panel of the baggage carousel of FIG. 8.

Referring now to FIGS. 9 and 10, conveyor panel 112 is illustrated in exploded view. Panel 112 includes a base plate 130 having a leading edge 132 (convex edge), a trailing edge 133 (concave edge), an edge 134, an edge 135, and a top surface 137. A recess 138 is formed in top surface 137 intermediate edge 134 and edge 135, and extending from leading edge 132 to trailing edge 133. A slot 139 and a slot 141 is formed in base plate 130 contiguous with recess 138, extending parallel to top surface 137 spaced from and directed towards edge 134 and edge 135, respectively. Conveyor panel 110 further includes an indicia plate 140 consisting of a sheet 142 and a sheet 143 with an indicia sheet 144 sandwiched therebetween. Sheets 142 and 143 are preferably transparent, permitting indicia on indicia sheet 144 to be viewed. As with the previous embodiment, it will be understood that the bottom sheet 142 need not be transparent as indicia is only viewed in one direction.

Referring specifically to FIG. 10, sheet 142 and sheet 143 of indicia plate 140 have an edge 147, an edge 148, a leading edge 149, and a trailing edge 150. Sheet 142 and sheet 143 are hingedly coupled at edges 148. The hinge coupling is achieved by adhering a material, such as tape, to aligned edges 148 of sheet 142 and sheet 143. In this manner, sheets 142 and 143 can be opened to receive indicia sheet 144 therebetween, while maintaining the desired alignment. It will be understood by those skilled in the art that the hinge coupling may be omitted as desired, resulting in slightly increased difficulty in aligning sheet 142 with sheet 143. Furthermore, while in the preferred embodiment the hinge coupling is formed with tape extending along the edge from the leading edge to the trailing edge, it will be understood that one or more small sections of the edges may be hingedly coupled to achieve the same effect. It is also contemplated that edge 147 or leading edge 149 of sheet 142 and sheet 143 may be hingedly coupled instead of edge 148. Leading edge 149 would be difficult to form a hinged coupling on in this manner, however, due to its curvature.

After indicia sheet 144 has been positioned between sheet 142 and sheet 143, indicia plate 140 is inserted within recess 138 of base plate 130. Insertion of indicia plate 140 onto base plate 130 may be accomplished in various manners. In the preferred embodiment as described in the previous embodiment, sheet 142 and sheet 143 are constructed of a material having a degree of flexibility such as plastic or resin materials like polycarbonate. Thus indicia plate 140 can be flexed, reducing the distance between edge 147 and edge 148. This reduced distance permits indicia plate 140 to be inserted into recess 138. Upon relaxing the flex, edge 147 and edge 148 are received within slots 139 and 141, respectively.

The tolerances between slot 139 and indicia plate 140 may be close enough to provide for a friction fit therebetween, eliminating the need for other retaining apparatus. Also, indicia plate 140 cannot slide from recess 138 because leading edges 149 and trailing edge 150 of adjacent panels abut However, for added security, or if a tight fit has not been achieved or is not desired, a fastening element may be employed. With additional reference to FIG. 11, in the preferred embodiment, an aperture 152 is formed in sheet 142 proximate edge 147 and an aperture 153 is formed in sheet 143 proximate edge 147. Aperture 152 is aligned with aperture 153 with sheet 142 overlying sheet 143 in the close position. An aperture 154 is formed in base plate 130 at slot 141 proximate edge 135. With indicia plate 140 positioned in recess 138, apertures 152, 153, and 154 align. A fastening member 155 such as a pin, screw, peg, etc., extends concurrently through apertures 152, 153, and 154, securely retaining indicia plate 140 in position.

When installed on baggage carousel 110, conveyor panels 112 abut adjacent panels 112 as illustrated in FIG. 8. This presents a substantially unbroken view of indicia sheets 144 of adjacent panels. Thus, panels 112 are installed to form one or more single panel or compound panel images, as desired for advertising, etc. Changing the indicia employed is easily accomplished by removing the desired indicia plate 140, separating sheet 142 and sheet 143 with alignment maintained by the hinge coupling, and replacing sheet 144 with an indicia sheet containing the desired indicia. Sheet 142 and sheet 143 are then closed into aligned and overlying relationship with the new indicia sheet captured therebetween. Indicia plate 140 containing the new indicia is then inserted into recess 138 of base plate 130. During this entire procedure, base plate 130 can remain in position, attached to baggage carousel 110. Furthermore, sheet 142 and sheet 143 are reusable with only indicia sheet 144 being replaced.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A conveyor panel comprising:
   a base plate having an upper surface, the upper surface having a recess formed therein and bounded by a slot on at least one side;
   an indicia plate including a first sheet overlying a second sheet, the first sheet hingedly coupled at a first edge to a first edge of the second sheet;
   an indicia sheet captured between the first sheet and the second sheet; and
   the indicia plate removably carried in the recess of the indicia plate, and extending into the slot on at least one side.

2. A conveyor panel as claimed in claim 1 wherein the indicia sheet is visible through the first sheet.

3. A conveyor panel as claimed in claim 1 wherein the indicia plate extends from a leading edge of the base plate to a point spaced from a trailing edge of the base plate.

4. A conveyor panel as claimed in claim 3 wherein a top surface of the indicia plate is inset from the top surface of the base plate.

5. A conveyor panel as claimed in claim 1 wherein the indicia plate extends from a leading edge of the base plate to a trailing edge of the base plate.

6. A conveyor panel comprising:
   a base plate having an upper surface, the upper surface having a recess formed therein and bounded by a slot on at least one side;
   an indicia plate including a first sheet overlying a second sheet;
   an indicia sheet captured between the first sheet and the second sheet;
   the indicia plate removably carried in the recess of the indicia plate, and extending into the slot on at least one side;
   a first aperture extending through the base plate at the slot;
   a second aperture extending through the first sheet aligned with the first aperture;
   a third aperture extending through the second sheet aligned with the first aperture; and
   a securing member extending concurrently through the first, second, and third apertures.

7. A baggage carousel comprising:
   an attachment member movable about a continuous circuit; and
   a conveyor panel coupled to the attachment member, the conveyor panel including:
      a base plate having an upper surface, the upper surface having a recess formed therein and bounded by a slot on at least one side;
      an indicia plate including a first sheet overlying a second sheet, the first sheet hingedly coupled at a first edge to a first edge of the second sheet;
      an indicia sheet captured between the first sheet and the second sheet; and
      the indicia plate removably carried in the recess of the indicia plate, and extending into the slot on at least one side.

8. A baggage carousel as claimed in claim 7 wherein the indicia sheet is visible through the first sheet.

9. A baggage carousel as claimed in claim 7 wherein the indicia plate extends from a leading edge of the base plate to a point spaced from a trailing edge of the base plate.

10. A baggage carousel as claimed in claim 9 wherein a top surface of the indicia plate is inset from the top surface of the base plate.

11. A baggage carousel as claimed in claim 7 wherein the indicia plate extends from a leading edge of the base plate to a trailing edge of the base plate.

12. A baggage carousel comprising:
   an attachment member movable about a continuous circuit; and
   a conveyor panel coupled to the attachment member, the conveyor panel including:
      a base plate having an upper surface, the upper surface having a recess formed therein and bounded by a slot on at least one side;
      an indicia plate including a first sheet overlying a second sheet;
      an indicia sheet captured between the first sheet and the second sheet;
      the indicia plate removably carried in the recess of the indicia plate, and extending into the slot on at least one side;
      a first aperture extending through the base plate at the slot;
      a second aperture extending through the first sheet aligned with the first aperture;
      a third aperture extending through the second sheet aligned with the first aperture; and
      a securing member extending concurrently through the first, second, and third apertures.

13. A method of displaying indicia on an endless conveyor comprising the steps of:
   providing an endless conveyor;
   providing a plurality of conveyor panels, each panel including a base plate having an upper surface, the upper surface having a recess formed therein and bounded by a slot on at least one side, and an indicia plate including a first sheet overlying a second sheet, the indicia plate removably carried in the recess of the indicia plate, and extending into the slot on at least one side;
   installing the plurality of conveyor panels on the endless conveyor;
   providing an indicia sheet having a desired indicia thereon;
   removing the indicia plate;
   separating the first sheet from its overlying engagement with the second sheet by pivoting the first sheet from the second sheet at a hinged coupling, coupling a first edge of the first sheet to a first edge of the second sheet;
   placing the indicia sheet between the first sheet and the second sheet;
   replacing the first sheet in its overlying engagement with the second sheet; and
   inserting the indicia plate into the recess so it extends into the slot on at least one side.

14. The method as claimed in claim 13 further including replacing the indicia sheet by removing the indicia plate, separating the first sheet from its overlying engagement with the second sheet, removing the indicia sheet, placing a second indicia sheet between the first sheet and the second sheet, replacing the first sheet in its overlying engagement with the second sheet, and re-inserting the indicia plate into the recess so it extends into the slot on at least one side.

15. A method of displaying indicia on an endless comprising the steps of:
   providing an endless conveyor;
   providing a plurality of conveyor panels, each panel including a base plate having an upper surface, the upper surface having a recess formed therein and bounded by a slot on at least one side, and an indicia plate including a first sheet overlying a second sheet, the indicia plate removably carried in the recess of the indicia plate, and extending into the slot on at least one side;
   providing a first aperture extending through the base plate at the slot;

providing a second aperture extending through the first sheet;

providing a third aperture extending through the second sheet;

installing the plurality of conveyor panels on the endless conveyor;

providing an indicia sheet having a desired indicia thereon;

removing the indicia plate;

separating the first sheet from its overlying engagement with the second sheet;

placing the indicia sheet between the first sheet and the second sheet;

replacing the first sheet in its overlying engagement with the second sheet; and inserting the indicia plate into the recess so it extends into the slot on at least one side;

aligning the first, second and third apertures; and inserting a securing member concurrently through the first, second, and third apertures.

* * * * *